US006944135B2

(12) United States Patent
Novaes

(10) Patent No.: US 6,944,135 B2
(45) Date of Patent: Sep. 13, 2005

(54) METHODS AND ARRANGEMENTS FOR ESTABLISHING A GROUP COLLABORATION SESSION UTILIZING MULTIPLE MULTICAST DISTRIBUTION TREES

(75) Inventor: Marcos N. Novaes, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 822 days.

(21) Appl. No.: 09/906,935

(22) Filed: Jul. 16, 2001

(65) Prior Publication Data

US 2003/0012215 A1 Jan. 16, 2003

(51) Int. Cl.[7] .............................................. H04L 12/28
(52) U.S. Cl. .................... 370/256; 370/390; 370/400
(58) Field of Search ................................ 370/254, 256, 370/390, 432, 400, 260, 259; 709/238, 245

(56) References Cited

U.S. PATENT DOCUMENTS

| | | | | |
|---|---|---|---|---|
| 5,606,669 A | * | 2/1997 | Bertin et al. ................. | 709/223 |
| 6,526,054 B1 | * | 2/2003 | Li et al. ...................... | 370/390 |
| 6,728,777 B1 | * | 4/2004 | Lee et al. .................... | 709/238 |
| 2002/0150094 A1 | * | 10/2002 | Cheng et al. ................ | 370/389 |

* cited by examiner

*Primary Examiner*—Duc Ho
(74) *Attorney, Agent, or Firm*—Ference & Associates

(57) ABSTRACT

Methods and arrangements for establishing group collaboration between different distributed networks. At least two publisher nodes are prompted to generate individual distribution trees associated with each publisher node, wherein each individual distribution tree includes at least one subscriber node.

11 Claims, 9 Drawing Sheets

METHODS AND ARRANGEMENTS FOR ESTABLISHING A GROUP COLLABORATION SESSION UTILIZING MULTIPLE MULTICAST DISTRIBUTION TREES

FIELD OF THE INVENTION

The present invention relates generally to the field of digital communications, and more particularly to packet transmission systems involved in the management of multicast communications to a plurality of users.

BACKGROUND OF THE INVENTION

In the field of communication networks, the term multicast refers to a data package switching technology in which a single data packet is received by a plurality of nodes. This mode of transmission is specially useful when several nodes in the network need to receive data packets which emanate from the same source. The multicast technology reduces the number of separate transmissions and data switching operations which are necessary to deliver a data package to a set of nodes in a communications network. The communications network contains specialized nodes which are called router nodes, or package switching nodes. Such nodes preform the package switching operation which route a given data package along the network towards a specific destination.

The multicast capability of a network is an extension of the point to point transmission infrastructure of the communications network. There are known to exist a number of network communication standards, the most prominent being the Internet Protocol (IP). Other protocols exist which are distinct to IP, such as Asynchronous Transfer Mode (ATM), or are an extension of the IP protocol. Similarly, several multicast protocols exist which implement the multicast capability which are designed for the several point to point transmission mode protocols. The most prominent of such multicast protocols are the implementations of multicast, which are integrated with the basic IP protocol. Some of these implementations have become standards, such as DVMRP and PIM, and yet others remain under discussion, such as MOSPF. (These are all currently existing multicast technologies, as defined by the IETF [Internet Engineering Task Force]. As DVMRP [Distance Vector Multicast routing Protocol] and PIM [Protocol Independent Multicast] are now standard, they are published as Internet Drafts by the IETF. As MOSPF [Multicast Open Shortest Path First Protocol] is still under discussion at the IETF, it is published as an RFC document [i.e., "Request for Comments"]. The references for these protocols are as follows: DVMRP-IETF Internet Draft; MOSPF-IETF RFC 1584; and PIM-IETF Internet Draft.)

Generally, it can be said that all the currently existing multicast protocols have one characteristic in common, which is the fact that they utilize the same addressing scheme as the underlying point to point protocol. This fact limits the addressing capability of the multicast protocol to that of the underlying point to point protocol. For example, this characteristic makes the protocols in question unsuitable in a scenario in which a data source needs to send a data package to a subset of all of its receivers. Since the number of all possible subsets of receivers of data from a given source grows exponentially with the number of receivers, conventional multicast technology tends to be inadequate for a variety of applications requiring a finer addressing capability.

Apart from the fact that each conventional multicast protocol is usually designed as an extension of the underlying point to point protocol, another important aspect of the design of existing multicast technology is that of the design and maintenance of the multicast distribution trees. A multicast distribution tree is a distributed data structure which includes a number of router nodes, a number of source nodes and a number of receiver nodes. Typically, multicast distribution trees are derived from the actual configuration of the routers of the underlying protocol. In most such protocols, two nodes in the distribution tree are only "neighbors" if they are physically connected by a communications link. In some implementations, a facility exits which allows for a human operator to create links in a multicast distribution tree between two nodes which are not physical neighbors. Such links are called multicast tunnels. The utilization of multicast tunnels has become a necessity in several applications in which users are interconnected by a communications network which does not support any form of multicast protocol. This problem is particularly serious at present, because the most widely utilized communication network is the universal Internet, which was originally derived form the DoD (Department of Defense) ARPAnet and now is the most widely used private network which spans the entire planet and has a number of users approaching one billion.

The Internet presently only supports the IP point-to-point protocol. The Internet has been unable to support the IP multicast standard because of the sheer size of the Internet. In such a scenario, it becomes very hard to deploy a protocol which builds distribution trees efficiently. Even if this problem could be solved in the near future, another problem, the coarseness of the IP multicast addressing scheme, will still be a limitation of the multicast capability. In case the nodes in the interconnecting network do not support a protocol of choice, it will most likely be necessary to utilize protocol tunnels. The manual configuration, i.e., the construction of multicast distribution trees by human operators, becomes impractical in Internet applications.

In view of the foregoing, several needs have been recognized, among which is a need to provide multicast distribution tree technology configured for efficiently and automatically constructing a multicast distribution tree for nodes which are separated by a network which does not support the specific multicast protocol.

SUMMARY OF THE INVENTION

In accordance with at least one presently preferred embodiment of the present invention, the problem of distributing data packages to a refined set of subscriber nodes is solved by the provision of a method for organizing a network of router nodes into a distribution structure which is termed a Subsource Addressing Multicast Tree. Contemplated herein are methods and arrangements which make use of a plurality of distribution trees to form a group collaboration session (i.e., a communication pattern among nodes in a network in which all nodes that participate in a given group are both receivers and providers of information to or from all the other nodes in the session).

In summary, the present invention provides, in one aspect, a method of establishing group collaboration between different distributed networks, the method comprising the steps of. designating at least two publisher nodes; establishing at least one interconnection between the at least two publisher nodes; designating at least two subscriber nodes; and prompting the at least two publisher nodes to generate individual distribution trees associated with each publisher node, wherein each individual distribution tree includes at least one subscriber node.

In another aspect, the present invention provides an apparatus for establishing group collaboration between different distributed networks, the apparatus comprising: an arrangement for designating at least two publisher nodes; an arrangement for establishing at least one interconnection between the at least two publisher nodes; an arrangement for designating at least two subscriber nodes; and an arrangement for prompting the at least two publisher nodes to generate individual distribution trees associated with each publisher node, wherein each individual distribution tree includes at least one subscriber node.

Furthermore, in an additional aspect, the present invention provides a program storage device readable by machine, tangibly embodying a program of instructions executable by the machine to perform method steps establishing group collaboration between different distributed networks, the method comprising the steps of designating at least two publisher nodes; establishing at least one interconnection between the at least two publisher nodes; designating at least two subscriber nodes; and prompting the at least two publisher nodes to generate individual distribution trees associated with each publisher node, wherein each individual distribution tree includes at least one subscriber node.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
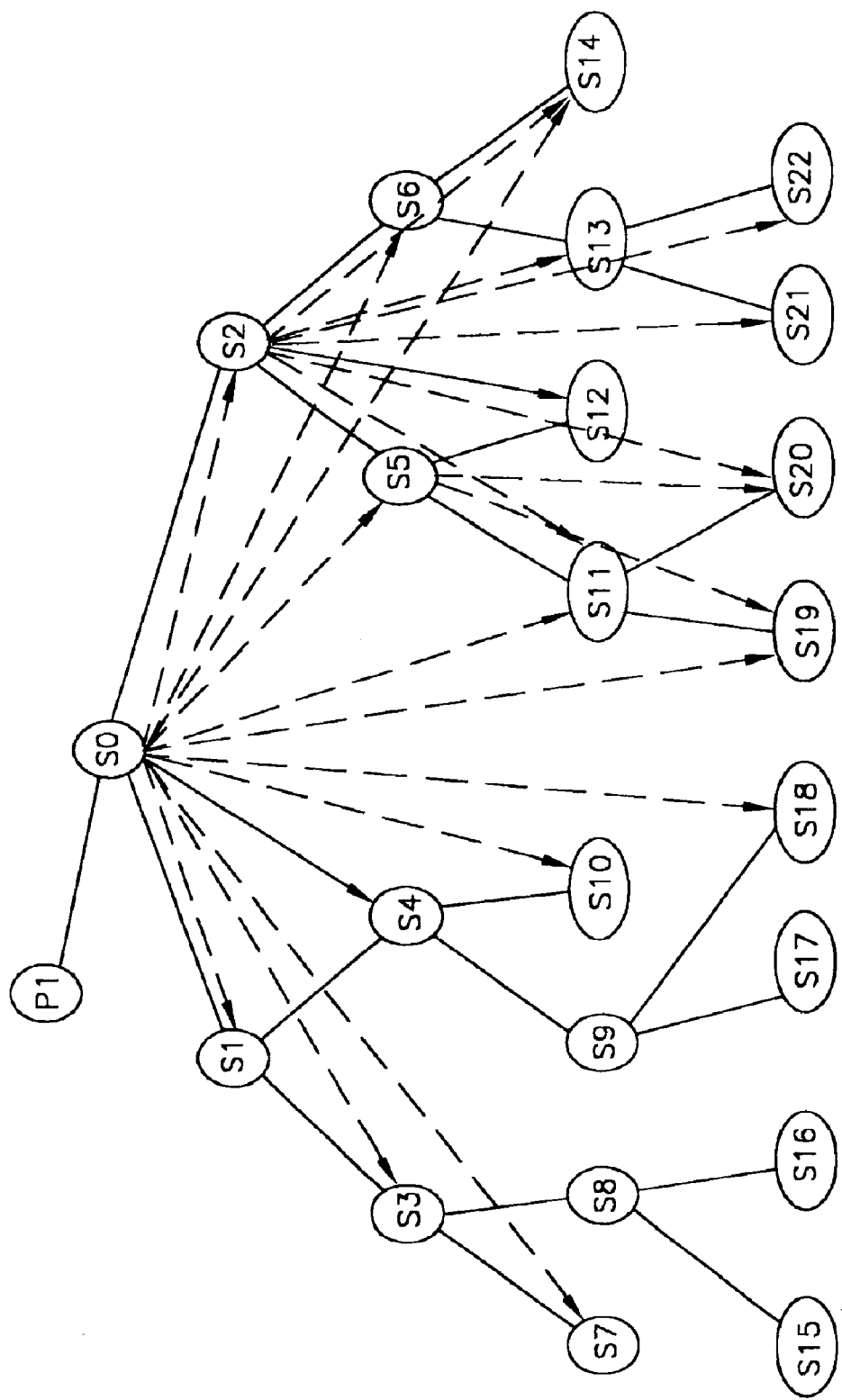
FIG. 1 schematically illustrates a distribution tree and some possible paths for data propagation.

Several other copending and commonly owned U.S. patent applications, filed concurrently herewith. disclose various processes and arrangements whose details may. in the role of background information, help provide a better understanding of one or more of the embodiments disclosed and contemplated herein. Accordingly, those applications are hereby fully incorporated by reference as if set forth in their entirety herein, and are as follows (including the title and Application Serial No. for each one): "Methods And Apparatus for the Propagation Of Multicast Transmissions In A Communications Network" application Ser. No. 09/906,928); "Methods and Apparatus for Updating Subsource Addressing Multicast Routing Records in a Communications Network" application Ser. No. 09/906,597); "Methods and Arrangements for Building a Subsource Address Multicast Distribution Tree Using Traced Routes" application Ser. No. 09/906,936); "Methods and Arrangements for Building a Subsource Address Multicast Distribution Tree Using Point to Point Routing Records" application Ser. No. 09/906,937); "Methods and Arrangements for Building a Subsource Address Multicast Distribution Tree Using Network Bandwidth Estimates" application Ser. No. 09/906,939); "Methods and Arrangements for Dynamically Modifying Subsource Address Multicast Data Distribution Trees" application Ser. No. 90/906,596); "Methods and Arrangements for Monitoring Subsource Addressing Multicast Distribution Trees" application Ser. No. 09/906, 593); and "Methods and Arrangements for Multicasting a Data Stream at Different Data Rates to Groups of Subscribers" application Ser. No. 09/906,938).

Throughout the present disclosure, various terms are utilized that are generally well-known to those of ordinary skill in the art. However, for the purposes of providing additional clarity, a number of such terms are briefly defined immediately herebelow. (Though one or more of the terms may well be defined elsewhere herein, it is deemed useful at this juncture to gather all of the following terms in one place, to provide a glossary of sorts that may serve, when needed, as a convenient and easily discernible reference point.)

A "data distribution path" is defined as the sequence of routing nodes which a specific message traverses from the moment that it originates in a publisher node to the moment that it arrives in a receiver node.

A "node" is a general vertex in the multicast distribution tree. There are three specific types of nodes in a SAM tree: the publisher node, which is the root of the tree, the intermediate nodes, which are the nodes with child nodes which are not the root node, and the leaf nodes, which are nodes without any children nodes. The term node is used in this embodiment to generally refer to any of type of node in the SAM tree.

As employed herein, the term "package switching operation" is used to refer to the operation performed by intermediate nodes, also called router nodes, in the data distribution path of a given data transmission. This operation involves receiving the data package and then making a decision of where to retransmit it, if necessary. This decision is made utilizing data that is stored in the proximity of the router node, generally referred to as routing tables. After the routing table are consulted, a package switching node will retransmit (switch) a package to either another intermediate router node or the final receiver of the package.

The term "piece wise point to point" is used to describe the way in which the SAM technology exploits the underlying point to point network protocol in multicasting a message to a plurality of receivers. A SAM message originates a the root node and is addressed with the point to point address of either a final receiver node or an intermediate router node. Whenever an intermediate router node receives a SAM message, it will retransmit it to one or more point to point addresses, of either final receivers or intermediate nodes. This operation is repeated until the message finally reaches a final receiver, or leaf node in the SAM tree. Therefore, a single message is transmitted to a variety of receivers utilizing different point to point addresses along the transmission path. It can thus be said that SAM transmissions are always made using the point to point mode of transmission at every step (piece )of the transmission path, and that the transmission pattern is therefore piece wise point to point.

The term "point of divergence" refers to a node in the SAM tree which has more than one descendant node to which it has to route a given message.

The term "point to point" is used to refer to a transmission mode in which a given message is transmitted from a single source (or point) to a single receiver. Typically, communication networks only support point to point protocols, the most prevalently used being the Internet Protocol (IP) and the Asynchronous Transfer Mode (ATM) protocols. Other modes of transmission are possible, such a broadcast and multicast. Such protocol can be implemented extensions of the underlying (basic) point to point protocol.

The term "point to point address" refers to a network address utilized by basic point to point protocol provided by the communications network.

The term "protocol tunneling" refers to a technique which makes possible to transmit a data package encoded by a given protocol in a network which does not offer direct support for the protocol. The technique involves the encapsulation of the data package into a data segment which is addressed utilizing the basic point to point protocol supported by the network. The package is then transmitted from to a node which is able to receive and process it. These two nodes are referred to as the end points of the tunnel. The receiving node is then able decapsulate the original data package and retransmit it further. Eventually, the package arrives at a network which offers native support for the protocol.

A "publisher node" is a node which is a source of a given information. In SAM, messages are multicasted to a plurality of receivers utilizing a distribution tree, named the SAM tree, which is rooted at the publisher node.

The term "predicate" is used to refer to an additional data field used by SAM to extend the addressing capability of an underlying point to point protocol. This field is used by applications to store data which is used to define specific subsets of the information that originates from a publisher node.

The term "router node" is used to refer to a node which retransmits a given data package such that it can reach a specific final destination. The term "package switching node" is synonymous with this term.

"SAM" is an abbreviation for "Subsource Addressing Multicast".

The term "SAM protocol" refers to the collection of methods and operations which are used by source nodes to express interest in the subsets of information published by a given source, and by the source of information to publish message to subsets of subscribers.

The "SAM tree" is a data structure utilized to multicast messages from the node which is the source of the tree. The intermediate nodes (nodes without children) of the SAM tree are nodes which are capable of routing SAM messages to any of their descendants. The leaf nodes (nodes without children) are nodes that are final receivers of SMA messages. It is also possible for an intermediate node to be a final receiver of a SAM message.

The term "shared paths" is used in reference to the intersection of transmission path segments for a message addressed to a plurality of subscribers. In this embodiment this term is used in reference to both point to point and multicast routing paths. A point to point shared transmission path between two receivers of a message occurs when the routing decisions taken by the underlying point to point protocol define paths that traverse the same sequence of routing nodes for some portion of the paths. Similarly, a multicast shared path is an equal sequence of multicast routing nodes in the transmission paths for messages destined for multiple multicast addresses. In the field of multicast communications, performance gains are realized by exploiting common transmission paths, or shared paths, in both the point to point and the multicast package switching infrastructure.

The term "subsource addressing multicast" is used to collectively refer to a set of technologies which make possible for a source of information to multicast messages to any given subset of its receivers. This technology includes the SAM protocol and the SAM tree discussed above.

As employed herein, a "subscriber" is a node which has posted at least one subscriber operation, and a final receiver of SAM messages.

The term "tunneling" refers to the act of deploying a protocol tunnel (described above) for the transmission of a message.

The term "underlying protocol" is used to refer to the basic point to point protocol supported by the communications network.

At least one presently preferred embodiment of the present invention broadly embraces a multicast distribution tree capable of realizing multiple distribution paths. The distribution tree may be referred to as a Subsource Addressing Multicast tree, or a SAM tree. As described herebelow, the SAM tree is capable of realizing optimal distribution paths for any subset of the nodes of a given source which is the root of the tree. The tree is preferably configured such that it can be deployed as an extension of any underlying point to point protocol.

In accordance with at least one presently preferred embodiment of the present invention, the SAM multicast distribution tree is distinguished from other distribution trees because any given intermediate node can propagate a message not only to its direct descendants, but also to any number of indirect descendants. Therefore, in addition to keeping the basic state information which is required from a multicast distribution tree, such as parent and direct descendant information, each intermediate node in the tree also keeps data related to the propagation to indirect descendants. In other words, the SAM multicast tree can be used to propagate messages in a plurality of paths. In actuality, the SAM trees allows for the all possible combinations of data transfer paths between the root node of the tree and all possible subsets of its descendants. The SAM tree can therefore be utilized to support a very fine rained addressing scheme, such as the SAM protocol.

FIG. 1 illustrates a SAM tree and a few of the possible paths for data propagation from the node S0, denoted by the dotted arrows. Not all possible paths are shown, so as not to impair the clarity of the illustration. Each parent node is capable of sending a message directly or via a protocol tunnel to any of its descendants. The collection of all possible subpaths generate a distribution mesh capable of efficiently multicasting messages to any subset of receivers making optimum use of the shared transmission paths among receivers.

The data propagation patterns determined by the SAM propagation tree are preferably such that a message destined for multiple nodes will incur a minimum number of retransmissions. In one embodiment this is achieved by forcing the retransmissions to occur only at the points of divergence in the propagation path. This will result in the optimal utilization of shared paths among the subsets of receivers of the message. The direct transmission of a message from a parent node to its descendants can be made via a protocol tunnel, which will result in further gains in performance.

Preferably, the SAM tree includes a root node P1, which is the publisher of information, and a set of nodes (e.g., S0–S22) which are either direct or indirect descendants of the root node P1. The descendants of the root node P1 can be either the final destination of notification messages or intermediate router nodes. A router node is a node is capable of forwarding notification messages to other router nodes or subscriber nodes. A subscriber node is a node which is a final destination for a notification message. A router node may be a subscriber node as well as a router node.

As previously mentioned, multicast capability is usually added to a network as an extension of some previously existing point to point protocol. Preferably, the SAM tree is configured such that it makes an optimal use of the existing point to point message switching infrastructure. When a parent node in the SAM tree relays a message to one if its descendants utilizing the descendant's point to point address directly, it is avoiding the overhead of making several package switching operation at each intermediate node in the path from the parent to the descendant.

Since SAM extends the addressing capability of the underlying point to point protocol, it involves two kinds of data switching operations:

i. the basic point to point package switching operation ii. the extended multicast package switching operation, which is performed by the nodes in the network which function as SAM routers.

The direct addressing capability of the SAM tree results in a savings of both kinds of package switching operations, which makes SAM a very efficient multicast package switching infrastructure.

Preferably, the SAM communication infrastructure keeps specific state information in every node which participates in a SAM network. Accordingly, each node in a SAM network preferably keeps the following state:

i. Point to Point Address of the parent node ii. Point to Point Address of each child node iii. SAM distribution lists for any of the subsets of the node's descendants In a preferred embodiment, the distribution lists are identified by a predicate field, which extends the addressing capability of the underlying point to point protocol. This extra field is utilized by the specific application which uses the SAM protocol to identify subsets of receivers of the published information. The utilization of an application specific predicate field as a network address is a unique characteristic embraced herein.

The aforementioned embodiment carries out a preferred implementation of the SAM tree utilizing subscription and notification operations which utilize the predicate field. Here, an implementation utilizing the IP protocol as the underlying point to point protocol is discussed, but it should be understood that any similar implementation utilizing any other underlying protocol will not deviate from the spirit or scope of the present invention.

Preferably, the network addresses in SAM are defined by a pair of the following format:

<source,predicate> where:

i. The address of a source of information is itself expressed as a pair of the format [host address, port number]. The host address conforms to the addressing scheme of the underlying point to point protocol. In a sample implementation using TCP/IP this address can be given in dotted decimal format, or alternatively as a host name which can be mapped into a network address, and the port number refers to a communication port which is bound to the publisher process.

ii. The predicate field is utilized by the subscribers to specify a predicate which is interpreted by the publisher process to select a subset of the information stream.

(Though it is feasible to implement SAM over a variety of network protocols, the present discussion will be limited to implementation based on TCP/IP.)

For example, suppose that the publisher provides an information stream including an integer series which is updated at every second. For the present discussion, this information stream may be labeled "the value of X".

Assume now that a subscriber process wants to receive the current value of X, which is published by node P1 at port 7777, but only if X is greater than 130. In SAM, it is possible to express this specific interest with the following network address:

<P1:7777,"X>130">

In another example, the values of the X series indicate unique identifiers which label data items. Therefore, the subscriber could express the desire to receive updates of an item numbered 12345, published by P1 at port 8888, utilizing the following SAM address:

<P1:8888,"X=12345">

The SAM predicate value is preferably handled as a binary value which extends the IP network address, therefore "refining" the granularity of the addressability. It is therefore possible for subscribers to utilize any value, as long as this value can be understood by the publisher of the information. The routers using the SAM protocol have no semantic understanding of the predicates; they are handled exactly as network addresses. This allows SAM to be utilized by essentially any type of publisher system, even supporting different lengths in the predicate field.

Among several copending and commonly owned U.S. patent applications filed concurrently herewith, namely, "Methods And Apparatus for the Propagation Of Multicast Transmissions In A Communications Network" application Ser. No. 09/906,928), "Methods and Apparatus for Updating Subsource Addressing Multicast Routing Records in a Communications Network" application Ser. No. 09/906,597), "Methods and Arrangements for Building a Subsource Address Multicast Distribution Tree Using Traced Routes" application Ser. No. 09/906,936), "Methods and Arrangements for Building a Subsource Address Multicast Distribution Tree Using Point to Point Routing Records" application Ser. No. 09/906,937), "Methods and Arrangements for Building a Subsource Address Multicast Distribution Tree Using Network Bandwidth Estimates" application Ser. No. 09/906,939), "Methods and Arrangements for Dynamically Modifying Subsource Address Multicast Data Distribution Trees" application Ser. No. 09/906,596), "Methods and Arrangements for Monitoring Subsource Addressing Multicast Distribution Trees" application Ser. No. 09/906,593), there are described methods for building and maintaining a SAM message distribution tree which is rooted at a single, distinct publisher node. The SAM tree can be used in a variety of applications in which several subscriber nodes consume data provided by a single publisher node. But a single SAM tree may not be the best solution for distribution of messages in applications in which there are a plurality of publisher nodes. One example of such application is a group collaboration utility, such as the one described in the paragraph below, which includes a collection of software which allows several interconnected computers to exchange information. Although it is possible to use a single SAM tree for the distribution of messages among all publisher and subscriber nodes in the group collaboration scenario, it is possible to obtain significant gains in performance with the deployment of multiple SAM trees. Described herebelow is a framework for the deployment of multiple SAM trees in group collaboration utilities.

A group collaboration utility can be compared to a telephone conference call. The conference call is a mode of telephone communications which allows for several speakers in distant geographic locations to participate in the same telephone conversation. In this mode of operation, each speaker can hear every other speaker, and also to speak with any other speaker. It is very easy to transpose the conference call analogy to computer communications, since there are a variety of communication protocols, such as IP, which are capable of carrying voice signals. Another similar example is the Internet chat room, which allows for several users to type short messages and read messages from other users which are "in the same room". The concept of a Internet chat room is similar to the telephone conference call.

Figure 2:
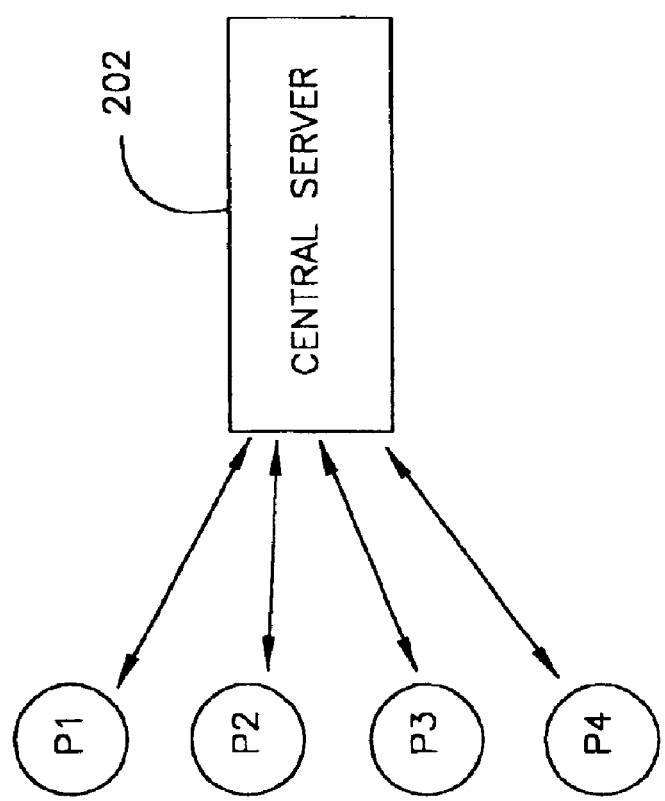
FIG. 2 illustrates a conventional "single server" solution for group collaboration.

There are three categories of solutions presently in existence for group collaboration:

i. single server
ii. multiple point to point connections
iii. single multicast distribution tree In the single server solution, all nodes in the group are attached to a central node, and all communications among the nodes is transmitted first the central node and then distributed by the central node to each peer. This solution centralizes all communications to the central node, and the central node may stressed to an overload of capacity if there are a large number of participants in the group collaboration application. Furthermore, this solution is not multicast capable, and generates a large number of redundant transmissions. FIG. 2 illustrates a typical layout of connections in a group collaboration utility which deploys a centralized node. As shown, a central server 202 may enjoy two-way connections with each of four publisher nodes P1,P2,P3,P4.

Figure 3:
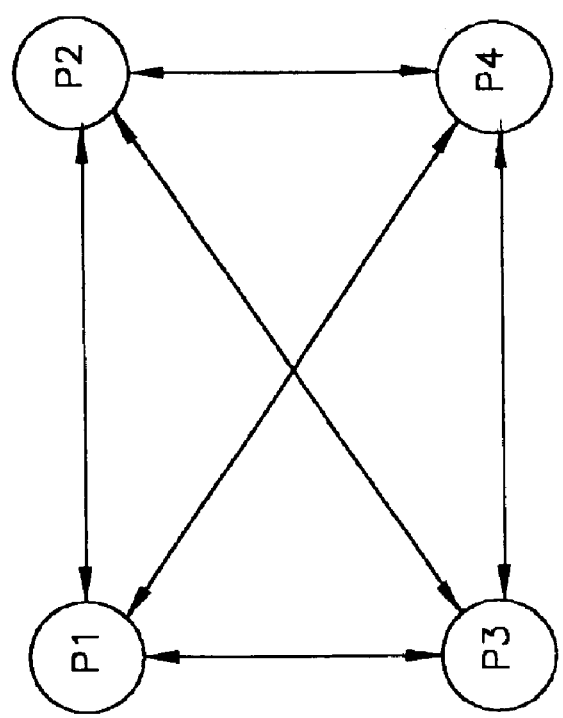
FIG. 3 illustrates a conventional "multiple point to point connection" solution for group collaboration.

The second conventional type of solution for the group collaboration utility is to create direct point to point connections for each node in the group to every other node in the group. This solution is also not multicast capable, because each peer has to transmit the same message to every other peer. The lack of multicast capability forces each node to spend to many resources in duplicate transmissions, and also consumes unnecessary network bandwidth. A typical layout of a multiple point to point solution is shown in FIG. 3, where four publisher nodes (P1–P4) all enjoy two-way interconnections with each other.

The third aforementioned type of conventional solution for the peer to peer collaboration application utilizes the standard IP Multicast technology. In this application, each node that participates in a group collaboration session joins a specific multicast group, and utilizes the same multicast distribution tree for message propagation. This solution is generally believed to be better than the two solutions previously discussed, but it still overloads the nodes which belong to the multicast tree. Because a single tree is utilized, any message from any node will necessarily be routed using the same point to point links among the nodes of the tree, and these links are therefore a point of contention in the transmission. Furthermore, the same multicast tree is shared by all multicast based applications in a given network, which further stresses the communication links among the routing nodes.

Figure 4:
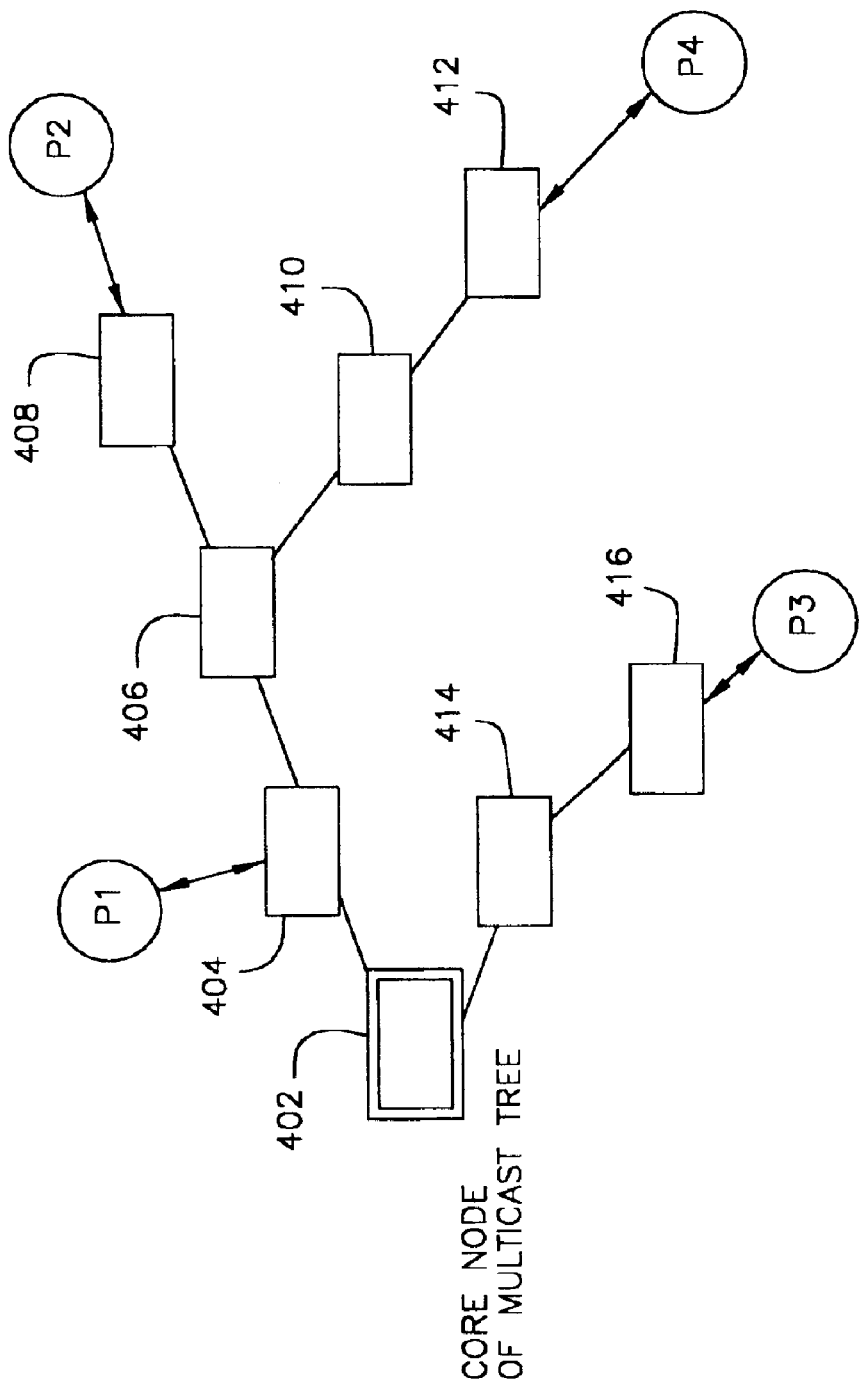
FIG. 4 illustrates a conventional "single multicast distribution tree" solution for group collaboration.

A typical deployment of such a single multicast tree solution is shown in FIG. 4, where the core node of the multicast tree is indicated at 402 and the square nodes (404–416) represent IP multicast routing nodes. The double sided arrows indicate that each publisher node in the group collaboration utility utilizes the multicast tree for both sending and receiving messages.

The utilization of a single multicast tree in the solution discussed immediately above causes an excessive amount of network traffic in the nodes which are part of the single multicast tree. This problem could be eliminated by the use of multiple multicast trees. Discussed herebelow is a solution, in accordance with at least one presently preferred embodiment of the present invention, for group collaboration applications which utilizes multiple multicast distribution trees. Specifically, the solution described herebelow preferably makes use of as many multicast trees as there are sources of data in the group collaboration utility. This preferably involves creating one unique SAM tree rooted at each participant of the group collaboration utility which is a source of information. The nodes which are the source of information are treated as SAM publisher nodes, and a specific SAM tree is then constructed with the objective of optimizing the communication paths between each publisher and its subscribers. In this solution, each node in group collaboration utility utilizes its own SAM tree to send messages, and receives messages from other SAM trees which are used by each of the other nodes.

Figure 5:
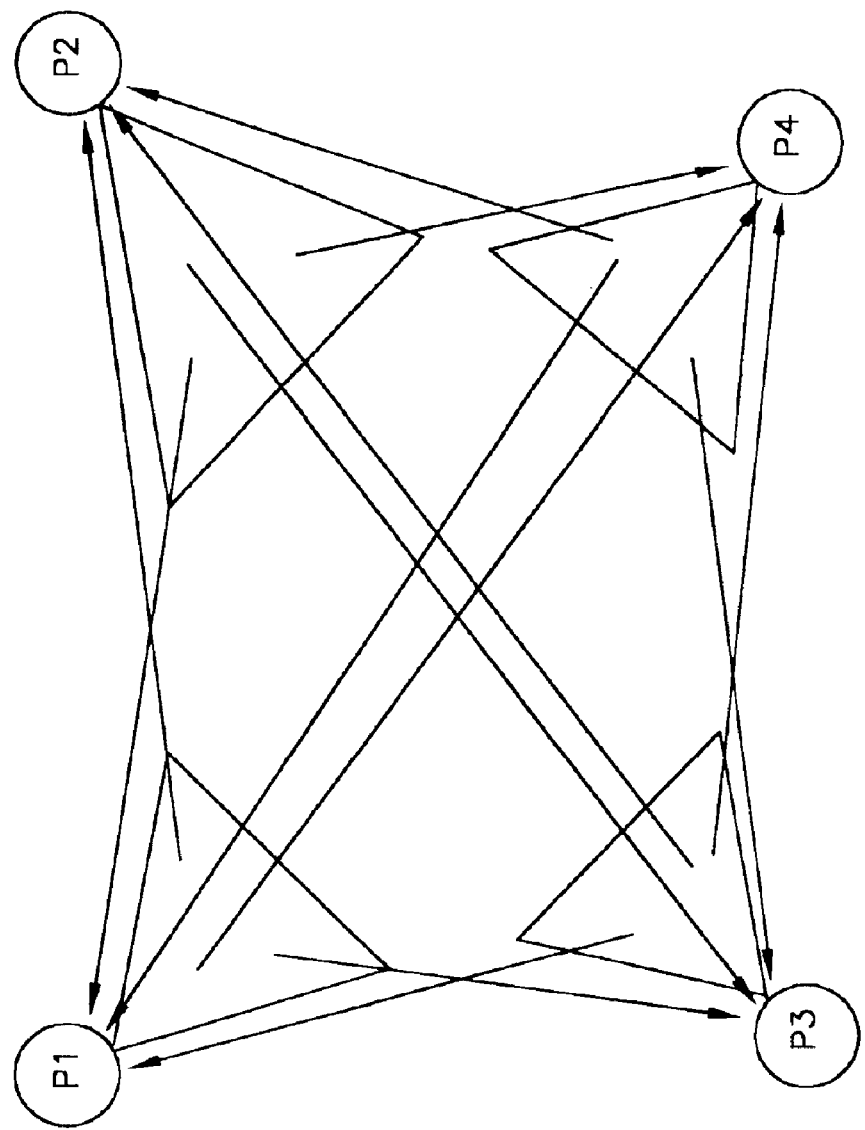
FIG. 5 illustrates a group collaboration application solution utilizing multiple multicast distribution trees.

FIG. 5 is an abstract representation of such deployment. The circles represent publisher nodes (P1–P4) in the group collaboration utility, and the triangles attached to each node represent a specific SAM distribution tree that each node utilizes to send messages. The unidirectional arrows indicate the direction of the messages which are transmitted by each node via their respective SAM distribution tree. It will be appreciated that this communication pattern is very different from any utilized in the three conventional solutions discussed further above, which themselves utilize the same path to send and receive messages.

An objective in the deployment of multiple multicast source trees in the group collaboration application is to spread the network traffic evenly among the possible existing point to point links among subscribers and publishers. The deployment of distinct trees will also spread the task of message switching among all the intermediate nodes of the SAM tree. For this reason, the multiple distribution tree framework avoids overloading any given node in the group collaboration session, therefore avoiding the contention experienced by other solutions.

The framework for the management of multiple SAM distribution trees may preferably include two basic methods:

i. A method for establishing a group collaboration session with multiple SAM trees.
ii. A method for reorganizing a collection of SAM trees such that the message switching operations are evenly spread across all intermediate nodes.

These methods are described in detail herebelow.

Presently, the disclosure turns to a method via which several nodes can participate in a group collaboration session using multiple SAM distribution lists. Here, the group collaboration session is labeled by a unique predicate. The participants in the session are required to know the session predicate before being able to join the session, and for this reason a session manager node is employed. The point to point address of the session manager must preferably be known by all participants. The method by which the session is established may then be as follows:

i. Each new participant that desires to join a specific session makes a point to point connection with the session manager, and it then able to browse the sessions which are currently serviced by the session manager. Each session entry contains the unique predicate, a short description, and the list of all participants which have joined the session.

ii. The new participant then selects the appropriate session and issues a connect request to the session manager.

iii. Upon receiving the connect request, the point to point address and port number of the new participant are then included in the list of participants for the specific session in the list that is stored at the session manager.

iv. The session manager then notifies the completion of the connect operation, and transmits to the new participant a list of all current participants in the session. The current participants are the participants which were included in the list by the previous successful connect operations. A node ceases to be a current participant if it requests a session leave operation to the session manager node.

v. The new participant then issues a SAM connect using the point to point address of each current participant in the list returned by the session manager. The new participant will request to connect to each current participant in the list using a random traversal of the current participant list.

vi. Each participant which receives a connect request will utilize the regular node placement procedure to place the new participant in its SAM tree.

vii. For each successful connection, the new participant will then issue a SAM subscribe operation, using the complete SAM address which includes the point to point address and the session predicate.

viii. All current members which receive a connect request from a new subscriber will also issue a connect request in return. This step will form the new SAM tree rooted at the new participant.

Figure 5A:
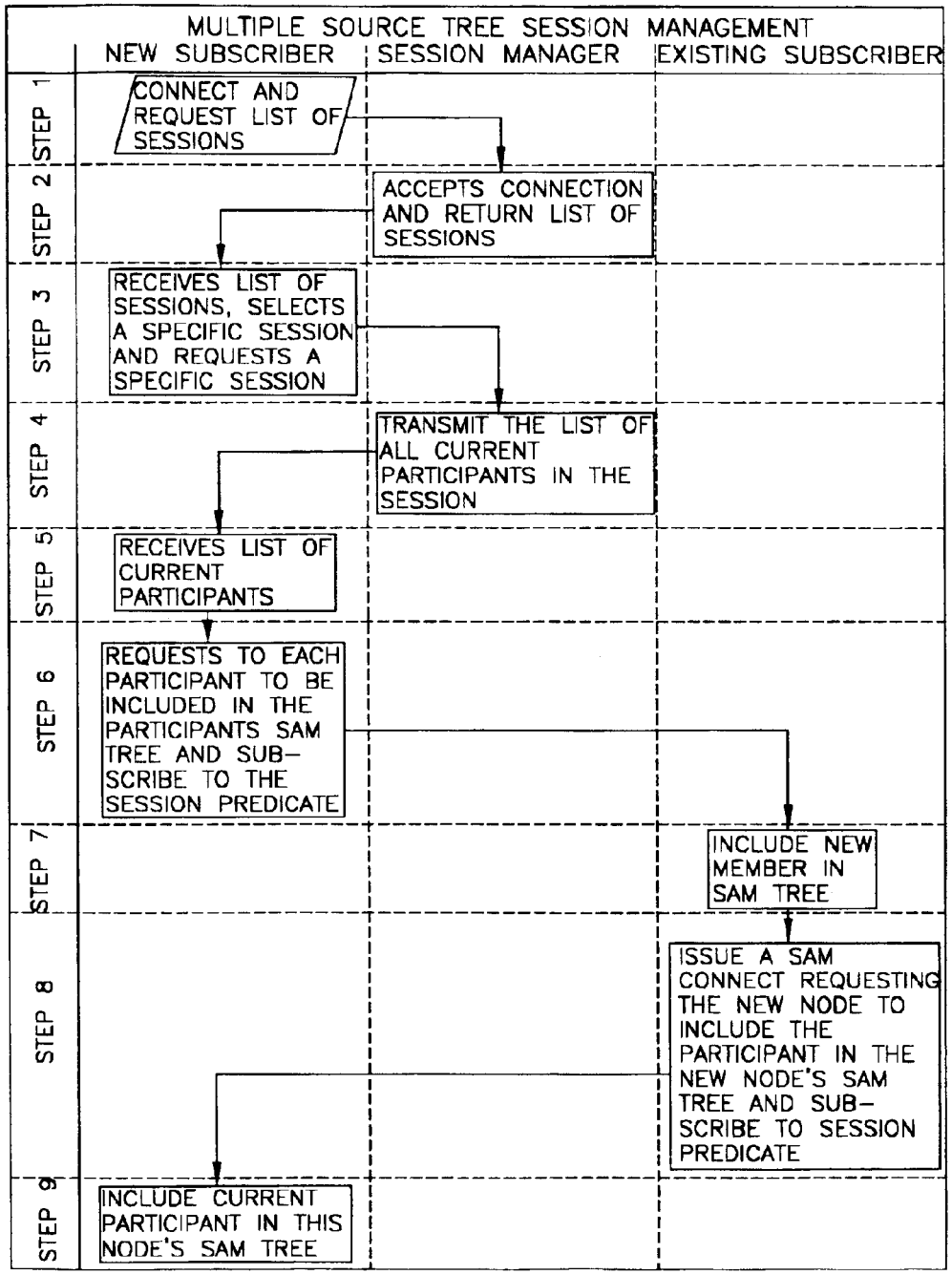
FIG. 5A schematically illustrates a basic method relating to multiple source tree session management.

FIG. 5A is a schematic illustration of the protocol outlined above.

This session formation procedure builds as many SAM trees are there are participants in the group collaboration session. Any of the two connection building methods described in the copending and commonly owned U.S. patent application, filed concurrently herewith, entitled "Methods and Arrangements for Building a Subsource Address Multicast Distribution Tree Using Network Bandwidth Estimates" application Ser. No. 09/906,939) could be used, but in this particular case the regular method should be preferred. The reason for the utilization of the regular procedure is because it avoids centralizing the routing operations in any particular node. The adaptive procedure would generate a contention in selected nodes in the network which are optimal routing points. The regular procedure generates different results according to the order in which the nodes are added to each tree, and therefore the random traversal utilized in step 5 generates different trees, which better distribute the message switching operations among all nodes.

The procedure detailed above also distributes the task of generating the SAM trees to each node, and therefore it is not necessary to utilize a central authority, which would be a point of contention (i.e., a node which offers a service to a large number of other nodes). Nevertheless, since all trees are independently generated, it is still possible that some intermediate nodes become overloaded. Described herebelow is a way in which each node is able to detect the overload condition and take appropriate action.

The method detailed above successfully constructs a set of fairly balanced SAM trees for a group collaboration session. Nevertheless, it is still possible that some intermediate nodes may be unfairly targeted by the tree collection. Fortunately, it is possible to detect and correct this condition. A participant node in the group collaboration contains subscription records for each subscription which was done in step 7 (vii) of the method above. In the case that the node also acts as an intermediate node in other SAM trees, it will also contain routing records for subscriptions posted by other nodes. Each node can therefore individually discover that it is being over utilized as a router node by the multiple tree collection associated with a specific session by observing the proportion of the subscription records and routing records which indicate the session predicate. The method described herebelow, on the other hand, allows a human administrator to define a threshold value T of the proportion of subscription records to routing records, such that if a value above T is reached, the intermediate node takes corrective action. This method may preferably include the following steps:

i. The total number for subscriptions which name a specific session predicate is kept in a variable named S.

ii. The number of addresses present in the distribution lists of all the routing records associated with a specific session predicate are kept in a variable named R.

iii. An overload ratio is computed by dividing the amount stored in R by the amount stored in S.

iv. The amount of the fraction R/S is then compared to the threshold value T that was defined by the human administrator of the network.

v. If the value of R/S exceeds T, then corrective action is taken by the node. The corrective action involves repositioning the node in one or more of the current tree to which it is a routing node, such that it becomes a leaf node. The node repositioning operations are carried out as previously explained.

Figure 6:
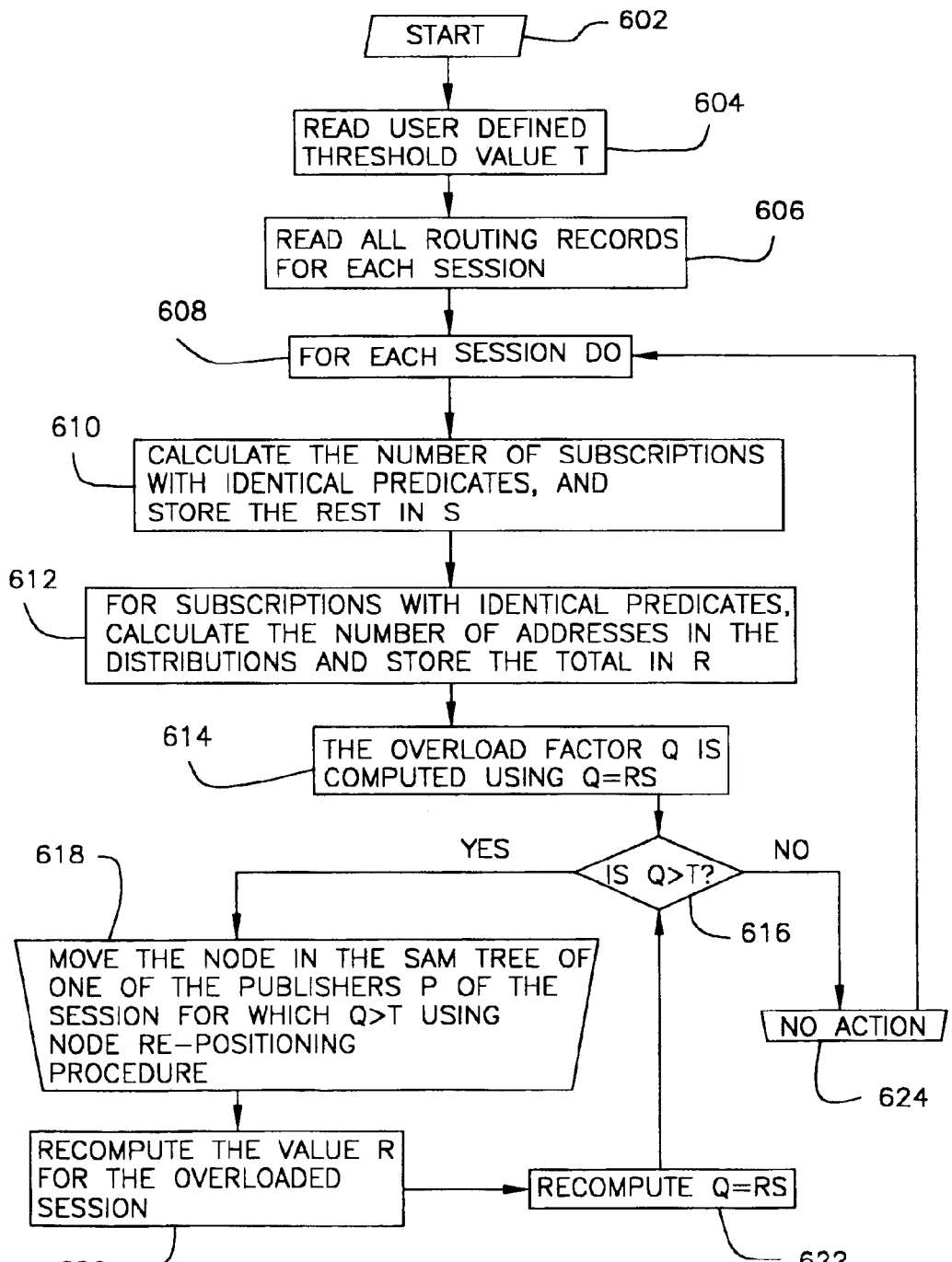
FIG. 6 depicts a method for monitoring route overloads at intermediate nodes.

FIG. 6 illustrates this method. Particularly, as shown in FIG. 6, such a method may start at 602 and then progress to a step of reading a user-defined threshold value T. At 606, all routing records are read for each session. At 608, it is established that at least some steps will be undertaken for each session, starting with 610, where the number of subscriptions with identical predicates are calculated and the result is stored in S. At 602, for those subscriptions with identical predicates, the number of addresses in the distribution lists is calculated, and this total is stored in R. At 614, the overload factor Q is computed via Q–R/S. At 616, it is queried as to whether Q is greater than T. If yes, then at 618, using a node re-positioning procedure, the node in the SAM tree of one of the publishers P of the session for which Q>T is moved. At 620, the value R is recomputed for the "overloaded" session. At 622, Q=R/S is recomputed. The process then returns to 616.

If the answer to the query at 616 is "no" at any time, then at 624 it is ascertained that no action is to be taken, and the process returns to 608.

Figure 7:
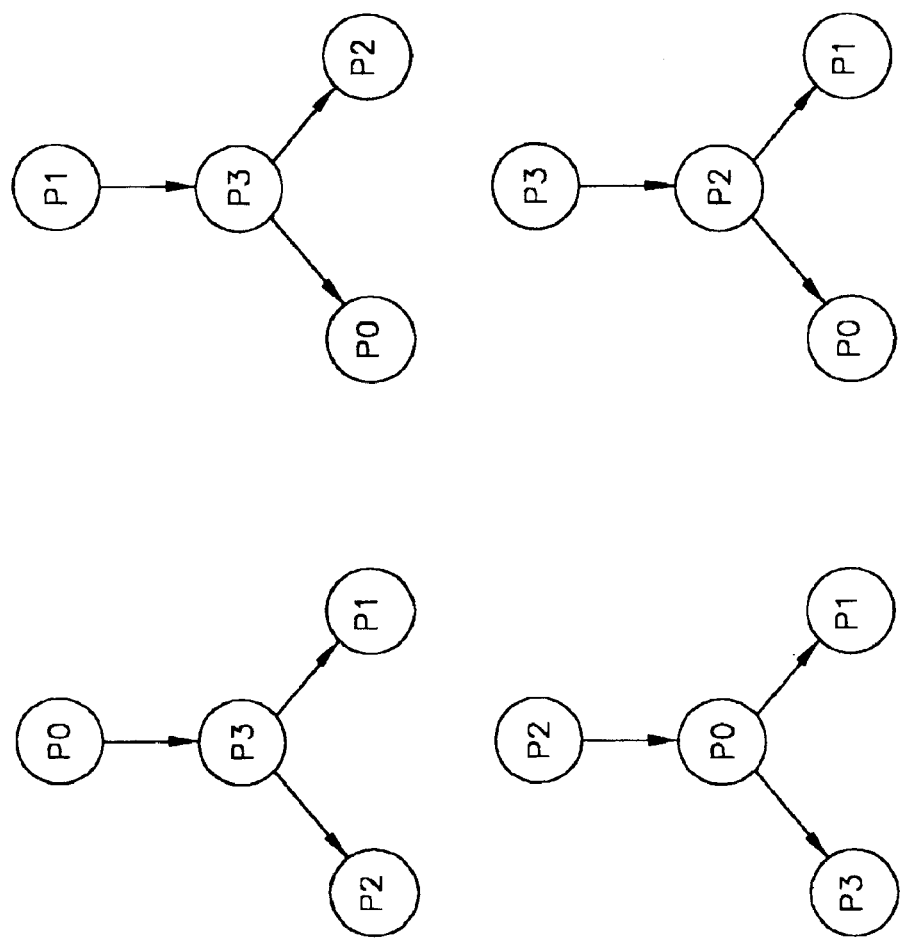
FIGS. 7 and 8 depict a sample deployment of the method set forth in FIG. 6.
Figure 8:
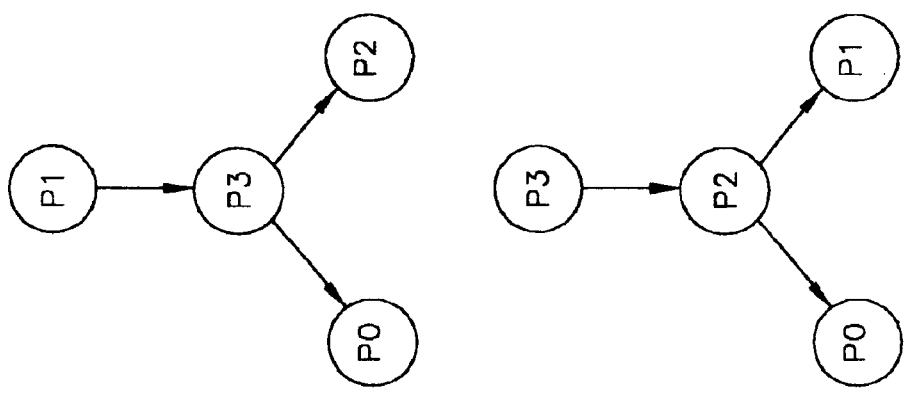
Figure 8:
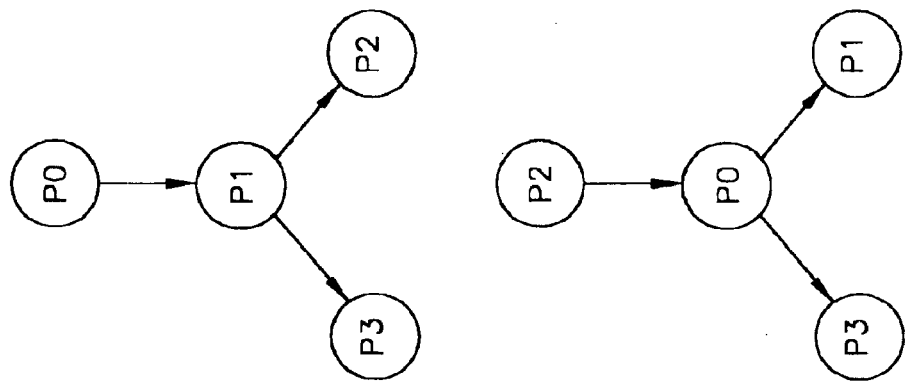

FIGS. 7 and 8 depict a sample deployment of the method described immediately above. In this sample deployment, four publisher nodes labeled P0, P1, P2 and P3 form a multiple tree multicast session. There is one SAM tree built for each publisher node, as shown in FIG. 7. The examination of the trees in FIG. 7 reveals that node P3 is used as an intermediate node in two trees, namely at the tree rooted at P0 and the tree rooted at P1. Also, it can be noted that the node P1 is not an intermediate node in any tree. The method described above is able to detect and fix this condition.

The subscription records and the routing records in P3 are shown below. The multiple tree session is identified by a common predicate, denoted sessionX below.

Subscription records at routing node P3:
<P0, sessionX, {P2,P1 }>
<P1, sessionX, {P0,P2 }>
<P2, sessionX, {}>
S=total number of records with common session identifier (sessionX)=3
R=total number of addresses in distribution list of common session (sessionX)=4
Q=R/S=4/3=1.333
T=user defined threshold=1.0

The value of T is set by the user administrator. It should be noted that Q is a ratio the number of nodes that a router services divided by the number of nodes in the session minus 1 (because the publisher node is not counted). A value large than indicates that the node is overused as a router node. In large scale applications, the value of T should be larger so as to minimize the reorganization of the SAM trees. In this case, however, using T=1, the condition:

$$Q=R/S>T$$

is detected and therefore the node P3 takes corrective action. The node P3 will then disconnect from SAM the tree rooted at P0. Because P3 was a parent node in this tree, its child nodes P1 and P2 detect that departure of node P3, and request re-attachment to the root node P0. In FIG. 8 it is assumed that node P1 became the new child of node P0, and P2 became a child of P1. Following this action, node P3 in turn requests of the root node P0 to be reinserted in its SAM tree, becoming also a child of P1 in that tree. This set of actions offload the routing burden of node P3, which is no longer a router node in the tree rooted at P0, resulting in the balanced set of trees shown in FIG. 8.

It is to be understood that the present invention, in accordance with at least one presently preferred embodiment, includes an arrangement for designating at least two publisher nodes; an arrangement for establishing at least one interconnection between the at least two publisher nodes, an arrangement for designating at least two subscriber nodes, and an arrangement for prompting the at least two publisher nodes to generate individual distribution trees associated with each publisher node. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method of establishing group collaboration between different distributed networks, said method comprising the steps of:
   designating at least two publisher nodes, wherein at least one publisher node is disposed within a first distributed network and at least one publisher node is disposed within a second distributed network;
   establishing at least one interconnection between said at least two publisher nodes;
   designating at least two subscriber nodes; and
   prompting said at least two publisher nodes to generate individual distribution trees associated with each publisher node, wherein each individual distribution tree includes at least one subscriber node.

2. The method according to claim 1, further comprising the step of establishing at least one distribution tree solely among said at least two publisher nodes.

3. The method according to claim 2, wherein said step of establishing at least one distribution tree comprises the step of establishing multiple and concurrent distribution trees among said at least two publisher nodes.

4. The method according to claim 3, wherein said step of establishing multiple and concurrent distribution trees comprises establishing a number of distribution trees equivalent to the number of publisher nodes.

5. The method according to claim 3, further comprising the step of organizing said multiple and concurrent distribution trees to ensure a balance in hierarchies represented by said multiple and concurrent distribution trees.

6. An apparatus for establishing group collaboration between different distributed networks, said apparatus comprising:
   an arrangement for designating at least two publisher nodes, wherein at least one publisher node is disposed within a first distributed network and at least one publisher node is disposed within a second distributed network;
   an arrangement for establishing at least one interconnection between said at least two publisher nodes;
   an arrangement for designating at least two subscriber nodes; and
   an arrangement for prompting said at least two publisher nodes to generate individual distribution trees associated with each publisher node, wherein each individual distribution tree includes at least one subscriber node.

7. The apparatus according to claim 6, further comprising an arrangement for establishing at least one distribution tree solely among said at least two publisher nodes.

8. The apparatus according to claim 7, wherein said arrangement for establishing at least one distribution tree is adapted to establish multiple and concurrent distribution trees among said at least two publisher nodes.

9. The apparatus according to claim 8, wherein said arrangement for establishing at least one distribution tree is adapted to establish a number of distribution trees equivalent to the number of publisher nodes.

10. The apparatus according to claim 8, further comprising an arrangement for organizing said multiple and concurrent distribution trees to ensure a balance in hierarchies represented by said multiple and concurrent distribution trees.

11. A program storage device readable by machine, tangibly embodying a program of instructions executable by the machine to perform method steps establishing group collaboration between different distributed networks, said method comprising the steps of:

designating at least two publisher nodes, wherein at least one publisher node is disposed within a first distributed network and at least one publisher node is disposed within a second distributed network;

establishing at least one interconnection between said at least two publisher nodes;

designating at least two subscriber nodes; and prompting said at least two publisher nodes to generate individual distribution trees associated with each publisher node, wherein each individual distribution tree includes at least one subscriber node.

* * * * *